UNITED STATES PATENT OFFICE.

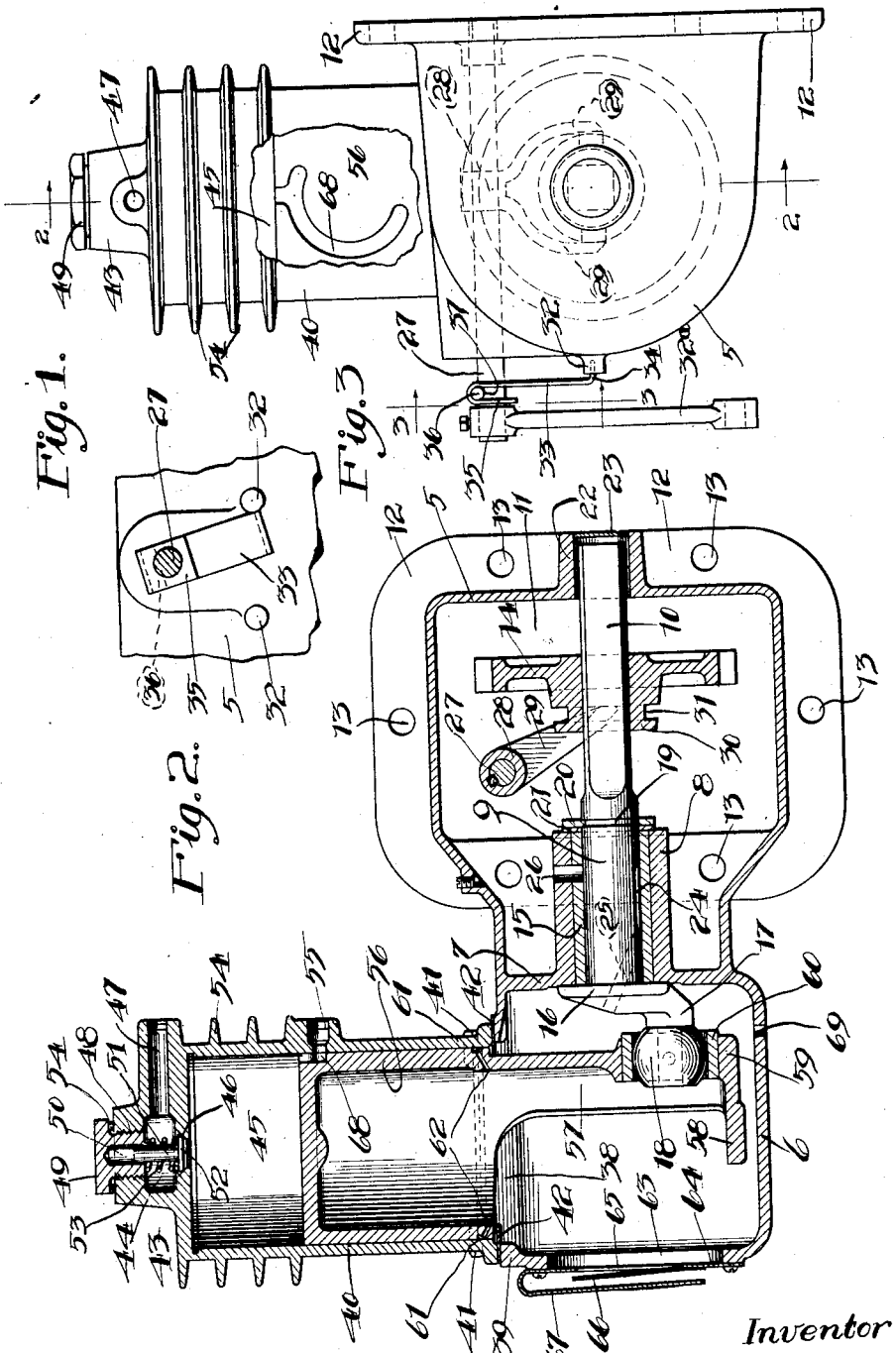

FRANK D. SHELDON, OF CHICAGO, ILLINOIS.

FLUID-PUMP.

1,388,315. Specification of Letters Patent. Patented Aug. 23, 1921.

Application filed May 10, 1920. Serial No. 380,096.

*To all whom it may concern:*

Be it known that I, FRANK D. SHELDON, a citizen of the United States, and a resident of Chicago, in the county of Cook and State of Illinois, have invented certain new and useful Improvements in Fluid-Pumps, of which the following is a specification.

This invention has relation to fluid pumps in general, but in the present instance, I have illustrated it and will hereinafter describe and explain its construction and operation in a type of pump which is particularly designed for use in connection with an automobile engine for its operation, and for use in garages or elsewhere for inflating automobile tires. However, I desire it to be distinctly understood that the pump may be operated by any suitable means and employed for any purpose for which it may be adapted without departing from the spirit of the invention.

The invention consists in certain peculiarities of the construction, novel arrangement, combination and operation of the various parts thereof, as will be hereinafter more fully set forth and specifically claimed.

The principal object of the invention is to provide a pump of the above mentioned general character, which shall be of few parts, compact in form, simple and inexpensive in construction, strong, durable, highly efficient and positive in operation. Another object is to provide means whereby the walls of the pump cylinder and the piston operating therein can be properly lubricated by means of a lubricant or oil carried in the crank-case without said lubricant escaping into the cylinder and from thence into the air outlet.

Other objects and advantages of the invention will be disclosed in the following description and explanation.

In the accompanying drawing, which serves to illustrate an embodiment of the invention—

Figure 1 is an end view of the pump showing a portion of the cylinder thereof broken away to illustrate the construction of the piston therein.

Fig. 2 is a vertical sectional view taken on line 2—2 of Fig. 1 looking in the direction indicated by the arrows, and Fig. 3 is a fragmental view partly in section and partly in elevation taken on line 3—3 of Fig. 1 as indicated by the arrows.

Like numerals of reference refer to corresponding parts throughout the different views of the drawing.

The reference numeral 5 designates the transmission casing and the numeral 6 the crank casing, which are by preference formed integrally and may be of any suitable size, form and material. The transmission casing 5 is divided from the crank casing 6 by means of the vertical wall 7 from which is extended into the casing 5 a sleeve bearing 8 for a portion of the crank shaft 9 which shaft preferably has a portion thereof substantially rectangular in cross-section as shown at 10 in Fig. 2 of the drawing. The casing 5 is provided in one of its vertical walls with an opening 11 and said casing is provided around said opening with an outwardly extended flange 12 which can be secured to the gear casing (not shown) of the engine by means of bolts extended through suitable openings 13 in said flange and engaging suitable openings in the gear casing.

By this arrangement it is obvious that the opening 11 in the casing 5 will provide communication with the gear casing in such a manner that the gear 14 slidably mounted on the portion 10 of the crank shaft 9 but so as to rotate with said shaft can be thrown into and out of mesh with one of the gears in the gear casing. Located within the sleeve or bearing 8 is a cylindrical bushing 15 in which the cylindrical portion of the crank shaft 9 is suitably journaled. At its end adjacent the crank casing 6 the crank shaft 9 is provided with an annular enlargement 16 and with a crank arm 17 which latter is provided with a spherical or partly spherical head 18 as is clearly shown in Fig. 2 of the drawing, in which view it will be observed that the end of the bushing 15 opposite the enlargement 16 on the crank shaft terminates flush with the inner end of the sleeve or bearing 8 and that the crank shaft is provided near said end of the bushing with a circumferential groove 19 in which is fitted a split washer or ring 20. Between this ring and the adjacent ends of the sleeve 8 and bushing 15 is interposed a washer or ring 21 of any suitable material. The outer end of the crank shaft is journaled in a suitable bearing 22 with which the casing 5 is provided and the outer end of said bearing is preferably closed by means of a compression plug or disk 23 of the well known type.

As will be observed by reference to Fig. 2 of the drawing, the cylindrical portion of the crank shaft 9 is provided with a longitudinally extended recess 24 from the end of which adjacent the crank casing 6 is extended a channel 25 which communicates with the crank casing. The opposite end of the recess 24 is so located that in the revolution of the crank shaft it will register with an opening 26 in the sleeve 8 and bushing 15 one time for each revolution of said shaft.

Transversely and horizontally journaled in the casing 5 is a rock shaft 27 which has fixed thereon within the said casing a depending yoke 28 the arms 29 of which stride the hub 30 of the transmission gear 14 and engage an annular groove 31 in said hub in such a way that said arms will offer but little if any impediment to the rotation of said gear. Fixed on the outer end of the rock shaft 27 is an arm $32^a$ which may be manually operated for rocking the shaft 27 so as to throw the gear 14 into and out of mesh with the gear or means used for driving the same. As shown in Figs. 1 and 2 of the drawing, the casing 5 is provided at a suitable distance below the shaft 27 with a pair of spaced projections 32 between which is disposed the lower portion of an arm 33 which is by preference made of a piece or strip of flat metal bent at its upper end approximately back upon itself as is shown in Fig. 1 of the drawing. The lower end of the arm 33 is provided with an inward extension 34 to alternately engage the projections 32 and thereby restrict the movement of the rock shaft. The portion 35 of the arm 33 which is bent approximately back upon said arm is provided with an opening of sufficient size to receive the shaft 27 and that portion of the arm 33 adjacent to the part 35 is also provided with a similar opening for a like purpose.

Between the upper end of the arm 33 and the upper surface of the shaft 27 is transversely located a securing pin 36 which is seated in a suitable recess 37 in the upper surface of the outer portion of the rock shaft. By this arrangement it is obvious that the arm 33 will be securely held in position on the shaft 27 so that when the latter is rocked in order to shift the position of the transmission gear 14, its movement will be restricted by reason of the contact of the extension 34 on the arm 33 with one or the other of the projections 32 on the wall of the transmission casing.

As is clearly shown in Fig. 2 of the drawing, the crank casing 6 is provided in its upper portion with an opening 38 surrounded by an annular wall 39 on which is mounted a cylinder 40 which may be secured to the crank casing by means of screw bolts 41 or otherwise. At about the union or juncture of the lower portion of the cylinder 40 with the upper portion of the crank casing an inwardly extended annular guard 42 is employed, and this guard is by preference interposed between the lower end of the cylinder 40 and the upper surface of the wall 39 of the crank casing.

The upper end of the cylinder 40 is provided with a head 43 having a valve chamber 44 which communicates with the compression chamber 45 of the cylinder by way of an inwardly and downwardly inclined valve seat 46. Leading from the valve chamber 44 is an outlet 47 for fluids which may have connected thereto a suitable pipe or hose for conducting fluid under pressure to the desired place for use. The upper portion of the head 43 of the cylinder is provided with a screw-threaded opening 48 in which is located a screw plug 49 having a vertically extended bore 50 leading from its inner surface but terminating short of the top of said plug. This bore or opening 50 is for the reception and operation of the valve stem 51 which has on its lower end a valve head 52 of a corresponding shape to the seat 46 so as to tightly close the same when said valve head is seated. Surrounding the stem 51 is a coil spring 53 which rests at one of its ends against the head 52 and at its other end against the inner end of the screw plug 49 by means of which plug the tension of said spring may be regulated. Located between the head of the screw plug 49 and the upper end of the head 43 of the cylinder is a gasket or washer 54 employed for preventing leakage of fluid. The upper portion of the cylinder 40 is by preference provided with circumferentially disposed radiating ribs 54 and below the same with an inlet opening 55 for the intake of air or other suitable fluid.

Located in the cylinder 40 is a piston 56 which is by preference of an inverted cup shape and has extended from its lower cylindrical portion a connecting arm which is designated as a whole by the numeral 57. This arm is substantially segmental in cross-section and has at its lower extremity a horizontal or lateral extension 58 for the purpose of splashing oil or lubricant upwardly in the movement of the piston. Just above the extension 58 the arm 57 is provided with an opening 59 in which is suitably fitted an annular bearing or bushing 60 for the reception and operation of the head 18 on the crank arm. Slightly above the lower end of the cylindrical part of the piston 56 the same is provided in its outer surface with a circumferential groove 61 which as shown in Fig. 2 is downwardly and outwardly beveled but has its upper edge lower at right angles to the walls of the piston and the cylinder.

Leading from this groove in a downwardly inclined direction through the wall of the piston 56 are a plurality of openings 62 for the discharge of oil or lubricant which will be splashed by the operation of the piston and its arm 57 and extension 56 upwardly in sufficient quantities to furnish lubrication between the piston and its cylinder. The groove 61 and the outlet 62 leading therefrom will act in the operation of the piston to remove any excess of oil or lubricant above that required, and thus prevent oil or lubricant passing into the compression chamber and from thence through the outlet of the cylinder. By employing the annular guard 42 it is apparent that the same will prevent an undue amount of lubricant being splashed against the inner surface of the cylinder and thereby reduce the possibility of lubricant escaping into the compression chamber. At its end opposite the casing 5 the crank casing 6 is provided with an opening 63 which is normally closed by means of a plate 64 secured thereto by means of screws or otherwise, which plate can be readily removed when access to the crank casing is desired. This plate is provided with an opening 65 and has secured thereto below said opening a leaf valve 66 which possesses some resiliency and will automatically close the opening 65 in the upward stroke of the piston, but will open said passageway on the downward strokes of the piston. To guard or protect the leaf valve 66 the plate 64 may be provided at its upper portion with a depending guard or member 67 located outwardly of said valve. The piston 56 has on its side or wall adjacent the inlet 55 of the cylinder an inlet passageway or channel 68 cut in its face and communicating with the upper end of the cylinder, as will be readily understood by reference to Figs. 1 and 2 of the drawings.

By connecting the crank shaft 9 with the piston 40 through the instrumentalities of the crank arm 17 having the spherical or partly spherical head 18 thereon and the piston arm 57 having the circular bearing 60 for said head, it is evident that combined longitudinal reciprocation and axial oscillation of the piston when the crank shaft is rotated will be effected, and that each point of the piston will be caused to describe a curve to correspond with the air passage 68 in the piston which is curved as shown, and of such length that just after the piston begins its downward movement from its uppermost position, the lower end of the channel 68 will come in communication with the inlet 55 and will remain in communication with said inlet until the piston reaches the lower extremity of its movement.

Immediately after, or for a brief interval after the piston passes the lowermost extremity of its stroke, the passageway 68 will still remain in communication with the intake port, and thus permit fluid to pass into the cylinder as long as there is less density therein than outside.

During the up stroke of the piston the fluid will be compressed, as it will be understood that the axial rotation of the piston when near the lower part of its stroke will shift the channel 68 away from and close the intake port 55 which will remain closed until just after the piston reaches the upper extremity of its movement and begins its downward movement. In the upward stroke of the piston it is manifest that as soon as the pressure in the compression chamber 45 exceeds the tension of the spring 53, and the pressure in the air line, the valve head 52 will be unseated, thus permitting the fluid under pressure to pass through the outlet port 47 for use.

In the operation of the pump the movement of the piston and its connections with the crank shaft will cause lubricant or oil with which the transmission casing 5 is supplied to pass through the passages 26, 24 and 25 into the crank casing 6 in quantities sufficient for the purpose of lubricating the parts of the pump. To prevent an excessive amount of lubricant collecting in the crank casing the bottom thereof is provided with a small outlet opening 69 through which thin fluid lubricant will be discharged, but as it is usually of a thick character a sufficient quantity of the lubricant will remain in the crank casing for the purpose of lubricating. By my improvements of the crank casing, it is evident that there will be no compression of the air in the crank chamber to offer resistance to the downward movement of the piston.

Having thus fully described my invention, what I claim as new and desire to secure by Letters Patent is—

1. In a fluid pump, the combination with a combined crank casing and a transmission gear casing, of a crank shaft horizontally journaled therein, a transmission gear slidably mounted on the crank shaft, means to shift said gear, passageways in one of the bearings of the crank shaft affording communication between the crank casing and said gear casing for the passage of lubricant, a cylinder mounted on the crank casing in communication therewith and having an inlet port and an outlet port, a spring-actuated valve controlling the outlet port, a piston located in the cylinder and having a passage-way for fluid coöperating with the inlet port for regulating the inflow of fluid, and means within the crank casing connecting the piston and the crank shaft for effecting combined reciprocating and oscillatory movement of the piston within the cylinder.

2. In a fluid pump, the combination with a combined crank casing and a transmission gear casing, of a crank shaft horizontally journaled therein, a transmission gear slidably mounted on the crank shaft, means to shift said gear, passage-ways in one of the bearings of the crank shaft affording communication between the crank casing and said gear casing for the passage of lubricant, said crank casing having a suction and pressure operated valved opening, a cylinder mounted on the crank casing in communication therewith and having an inlet port and an outlet port, a piston located in the cylinder and having a passage-way for fluid coöperating with the inlet port for regulating the inflow of fluid, and means within the crank casing connecting the piston and the crank shaft for effecting combined reciprocating and oscillatory movement of the piston within the cylinder.

FRANK D. SHELDON.